(12) United States Patent
Qu et al.

(10) Patent No.: US 12,576,866 B2
(45) Date of Patent: Mar. 17, 2026

(54) CALIBRATION FRAMEWORK FOR AUTONOMOUS VEHICLE SIMULATION TECHNOLOGY

(71) Applicant: TUSIMPLE, INC., San Diego, CA (US)

(72) Inventors: Shen Qu, San Diego, CA (US); Liu Liu, San Diego, CA (US); Junbo Jing, San Diego, CA (US); Haoming Sun, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 327 days.

(21) Appl. No.: 18/355,678

(22) Filed: Jul. 20, 2023

(65) Prior Publication Data

US 2024/0034341 A1      Feb. 1, 2024

Related U.S. Application Data

(60) Provisional application No. 63/369,933, filed on Jul. 29, 2022.

(51) Int. Cl.
| | |
|---|---|
| *B60W 50/06* | (2006.01) |
| *B60W 50/00* | (2006.01) |
| *B60W 60/00* | (2020.01) |
| *G05B 17/02* | (2006.01) |
| *G07C 5/02* | (2006.01) |

(52) U.S. Cl.
CPC ............ *B60W 50/06* (2013.01); *B60W 60/00* (2020.02); *G05B 17/02* (2013.01); *G07C 5/02* (2013.01); *B60W 2050/0056* (2013.01); *B60W*
2510/20 (2013.01); *B60W 2520/10* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2552/15* (2020.02)

(58) Field of Classification Search
None
See application file for complete search history.

(56) References Cited

U.S. PATENT DOCUMENTS

| | | | |
|---|---|---|---|
| 2007/0260438 A1 | 11/2007 | Langer et al. | |
| 2010/0168958 A1* | 7/2010 | Baino ..................... | B60Q 1/12 |
| | | | 702/94 |

(Continued)

*Primary Examiner* — Madison R. Inserra
(74) *Attorney, Agent, or Firm* — Perkins Coie LLP

(57) ABSTRACT

Vehicle dynamics related parameter(s) of an autonomous vehicle model can be calibrated so that the autonomous vehicle model can more accurately determine the driving related behaviors of the autonomous vehicle. An example method comprises obtaining, from sensor data, vehicle related parameters; performing a first determination of a slope of a road and a banking angle of the road based on a pitch angle of the vehicle and a roll angle of the vehicle, respectively; performing a second determination of a set of parameters that describe a driving-related operation of the vehicle; performing a third determination that at least one difference between at least one value from the set of parameters and a corresponding parameter from the plurality of vehicle related parameters exceeds at least one threshold value; and obtaining, in response to the third determination, a calibrated longitudinal dynamic-related parameter or a calibrated lateral dynamic-related parameter.

20 Claims, 8 Drawing Sheets

(56) References Cited

U.S. PATENT DOCUMENTS

| 2011/0208402 A1* | 8/2011 | Sladek, Jr. | ............ F02D 11/105 |
| | | | 701/102 |
| 2012/0067122 A1* | 3/2012 | Sakamoto | ................ B60Q 1/12 |
| | | | 73/488 |
| 2016/0068166 A1* | 3/2016 | Chen | ..................... B60W 40/06 |
| | | | 701/32.9 |
| 2020/0207412 A1* | 7/2020 | Al Assad | ........... B62D 15/0245 |

* cited by examiner

Road test sensor data 102

Vehicle pose information (e.g., pitch angle) 112

Perform filtering operation 114

Equivalent gravity force applied on the longitudinal direction of the vehicle 116

Figure 4:
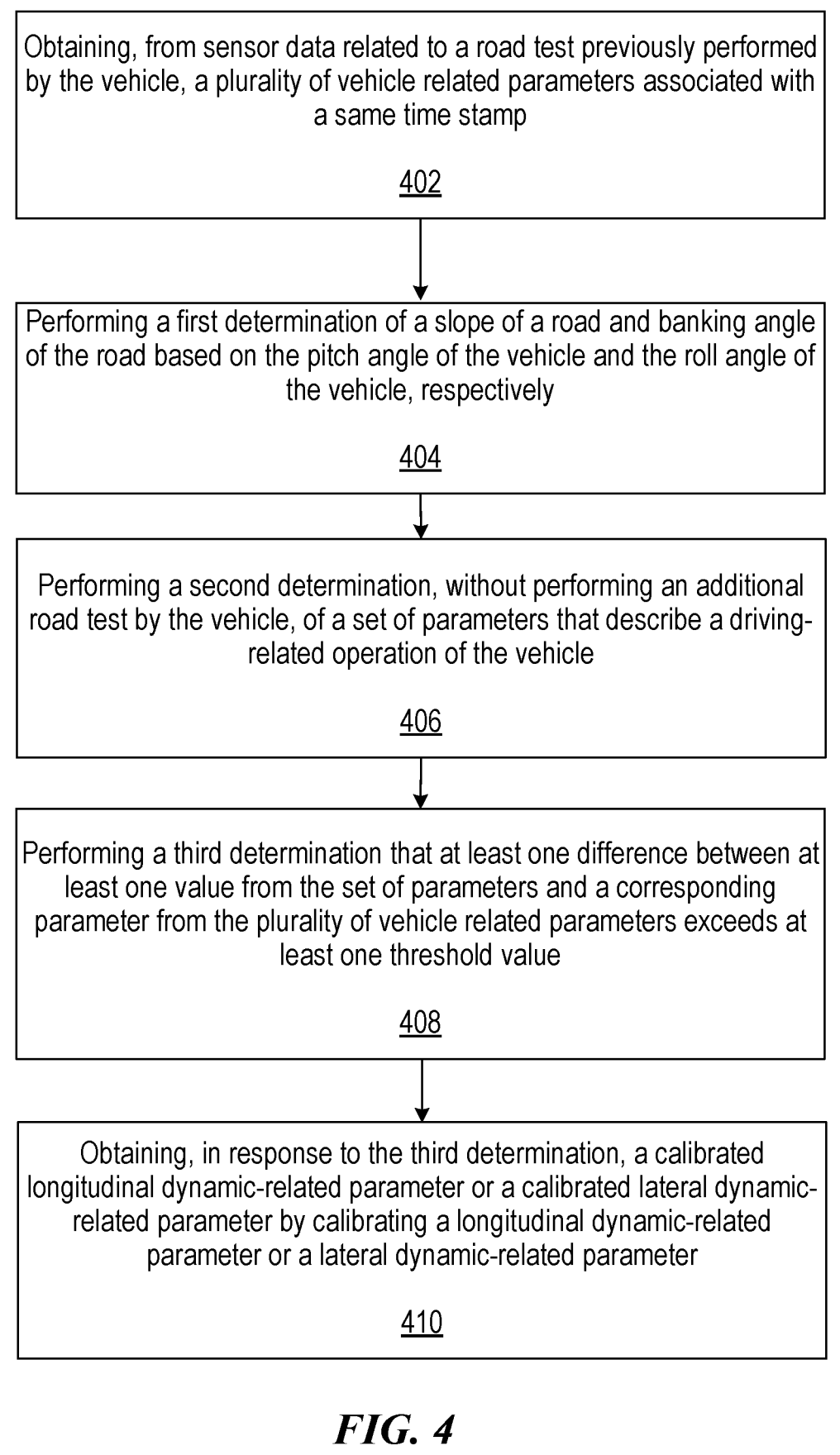

Obtaining, from sensor data related to a road test previously performed by the vehicle, a plurality of vehicle related parameters associated with a same time stamp

402

Performing a first determination of a slope of a road and banking angle of the road based on the pitch angle of the vehicle and the roll angle of the vehicle, respectively

404

Performing a second determination, without performing an additional road test by the vehicle, of a set of parameters that describe a driving-related operation of the vehicle

406

Performing a third determination that at least one difference between at least one value from the set of parameters and a corresponding parameter from the plurality of vehicle related parameters exceeds at least one threshold value

408

Obtaining, in response to the third determination, a calibrated longitudinal dynamic-related parameter or a calibrated lateral dynamic-related parameter by calibrating a longitudinal dynamic-related parameter or a lateral dynamic-related parameter

Road test sensor data 102
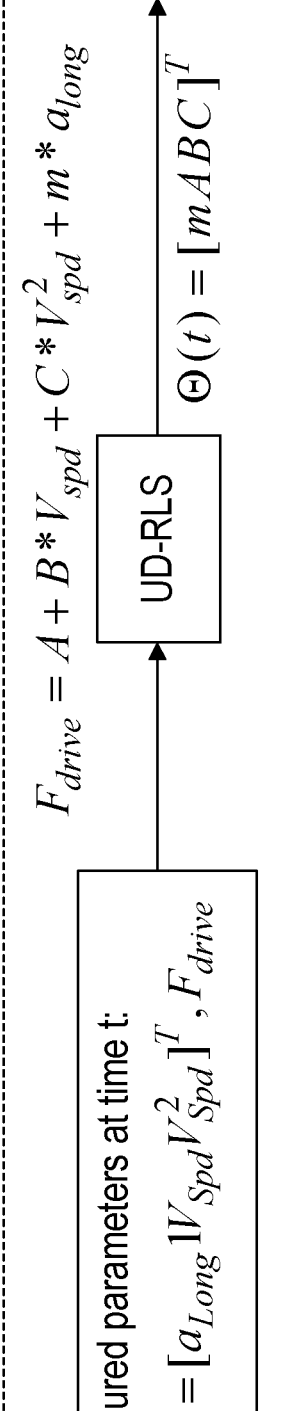
Simulation data
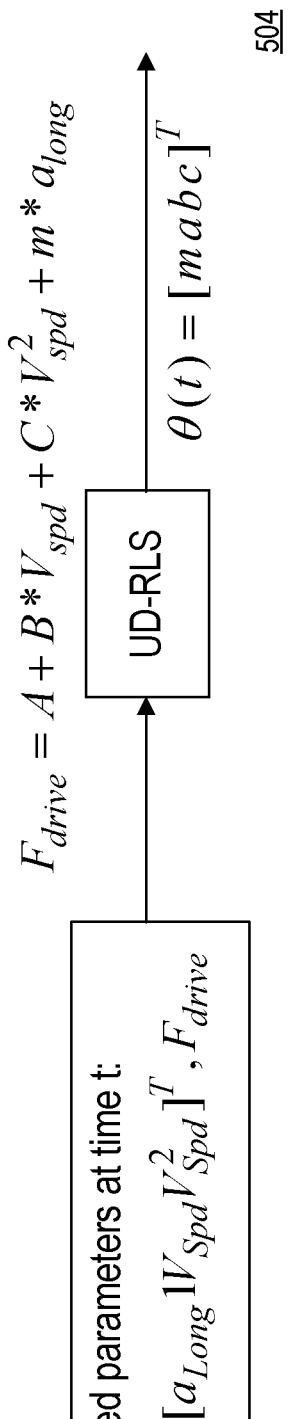
$$[\Delta m \Delta a \Delta b \Delta c]^T = \Theta(t) - \theta(t)$$
506
*FIG. 5*

CALIBRATION FRAMEWORK FOR AUTONOMOUS VEHICLE SIMULATION TECHNOLOGY

CROSS-REFERENCE TO RELATED APPLICATIONS

This document claims priority to and the benefit of U.S. Provisional Application No. 63/369,933, filed on Jul. 29, 2022. The aforementioned application is incorporated herein by reference in its entirety.

TECHNICAL FIELD

This document relates to systems, apparatus, and methods for calibrating an autonomous vehicle model based on road test data.

BACKGROUND

A vehicle may include sensors for several purposes. For example, sensors may be attached to the front and rear bumpers of a car to provide audible and/or visual cues to the driver to indicate a proximity of an object to the car. In another example, sensors may be installed on a roof of a vehicle to facilitate autonomous driving. Sensors can obtain data related to one or more areas that surround a vehicle. The sensor data can be processed to obtain information about the road or about the objects surrounding the autonomous vehicle. Thus, the sensor data obtained from the sensors on an autonomous vehicle can be processed or analyzed in real-time to safely maneuver the autonomous vehicle through traffic or on a highway.

SUMMARY

An autonomous vehicle can store sensor data related to a previously performed road test, where the sensor data can indicate an area or a road through or on which the autonomous vehicle operated from a starting point to a destination. The sensor data can also indicate objects around which the autonomous vehicle operated. This patent document present describes techniques to simulate driving related behaviors (e.g., steering, throttle, etc.,) of the autonomous vehicle by using the sensor data from the road test and an autonomous vehicle model, where the autonomous vehicle model can provide an output related to the driving related behavior based on the sensor data. Using the techniques described in this patent document, one or more vehicle dynamics related parameters related to the autonomous vehicle model can be calibrated so that the autonomous vehicle model can more accurately simulate the driving related behaviors of the autonomous vehicle.

An example method of calibrating a parameter related to a vehicle, comprises: obtaining, from sensor data related to a road test previously performed by the vehicle, a plurality of vehicle related parameters associated with a same time stamp, where the plurality of vehicle related parameters include a pitch angle of the vehicle and a roll angle of the vehicle; performing a first determination of a slope of a road and a banking angle of the road based on the pitch angle of the vehicle and the roll angle of the vehicle, respectively; performing a second determination, without performing an additional road test by the vehicle, of a set of parameters that describe a driving-related operation of the vehicle, where the set of parameters include a first yaw rate of the vehicle that is determined based at least on the banking angle, and where the set of parameters include a first amount of throttle of the vehicle that is determined based at least on the slope; performing a third determination that at least one difference between at least one value from the set of parameters and a corresponding parameter from the plurality of vehicle related parameters exceeds at least one threshold value; and obtaining, in response to the third determination, a calibrated longitudinal dynamic-related parameter or a calibrated lateral dynamic-related parameter by calibrating a longitudinal dynamic-related parameter or a lateral dynamic-related parameter, where the calibrated longitudinal dynamic-related parameter or the calibrated lateral dynamic-related parameter is sent to the vehicle or another vehicle, and where the calibrated longitudinal dynamic-related parameter or the calibrated lateral dynamic-related parameter is used by subsequent autonomous driving operations of the vehicle or the another vehicle.

In some embodiments, the longitudinal dynamic-related parameter includes one or more constant coefficients that is related to a longitudinal acceleration of the vehicle, or a drive force applied by the vehicle. In some embodiments, the lateral dynamic-related parameter includes one or more constant coefficients that is related to a lateral acceleration of the vehicle. In some embodiments, the set of parameters are determined by simulating the driving-related operation of the vehicle. In some embodiments, the slope of the road is determined by: filtering the pitch angle of the vehicle using a second order low pass filter to obtain a filtered pitch angle; determining an equivalent gravity force applied in a longitudinal direction of the vehicle using the filtered pitch angle; and determining the slope of the road by using the following equation: sin (the slope)*gravity=the equivalent gravity force applied on the longitudinal direction, where sin( ) is a trigonometric sine function. In some embodiments, the banking angle of the road is determined by: filtering the roll angle of the vehicle using a second order low pass filter to obtain the banking angle.

In some embodiments, the plurality of vehicle related parameters include a speed of the vehicle and a steering angle of the vehicle, and the set of parameters are determined by: determining an amount of throttle of the vehicle based on the speed of the vehicle; and determining the first yaw rate of the vehicle based on the amount of throttle, the steering angle of the vehicle, and the banking angle. In some embodiments, the at least one value from the set of parameters is the first yaw rate, and the third determination is performed by determining that a difference between the first yaw rate and a second yaw rate obtained from the plurality of vehicle related parameters is greater than a first predetermined threshold value. In some embodiments, the plurality of vehicle related parameters include a speed of the vehicle and a steering angle of the vehicle, a second amount of throttle of the vehicle is determined based on the speed of the vehicle, and the set of parameters includes the first amount of throttle of the vehicle that is determined based on the second amount of throttle, the steering angle of the vehicle, and the slope.

In some embodiments, the third determination is performed by determining that a difference between the first amount of throttle and a third amount of throttle obtained from the plurality of vehicle related parameters is greater than a second pre-determined threshold value. In some embodiments, the sensor data is obtained from sensors located on the vehicle and characterizes the road on which the vehicle is previously operated or an environment in which the vehicle is previously operated. In some embodiments, the longitudinal dynamic-related parameter includes one or more constant coefficients that is related to a longitudinal speed of the vehicle. In some embodiments, the lateral dynamic-related parameter includes one or more constant coefficients that is related to a yaw rate of the vehicle.

In some embodiments, the slope is determined by filtering the pitch angle of the vehicle to obtain a filtered pitch angle; determining an equivalent gravity force applied in a longitudinal direction of the vehicle using the filtered pitch angle; and determining the slope of the road based on gravity and the equivalent gravity force applied on the longitudinal direction. In some embodiments, the banking angle of the road is determined by: filtering the roll angle of the vehicle to obtain the banking angle. In some embodiments, the set of parameters are determined by determining a first yaw rate of the vehicle based on an amount of throttle, a steering angle of the vehicle, and the banking angle. In some embodiments, the set of parameters includes a first amount of throttle of the vehicle that is determined based on a second amount of throttle, a steering angle of the vehicle, and the slope, and the second amount of throttle of the vehicle is based on a speed of the vehicle. In some embodiments, the at least one value from the set of parameters is a drive force value.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 4 shows an example flowchart of calibrating one or more parameters for a vehicle.

FIG. 5 shows an example block diagram for a simulation module to use an upper diagonal-recursive least squares (UD-RLS) estimation technique to determine one or more longitudinal dynamic-related parameters of an autonomous vehicle.

DETAILED DESCRIPTION

Figure 1A:
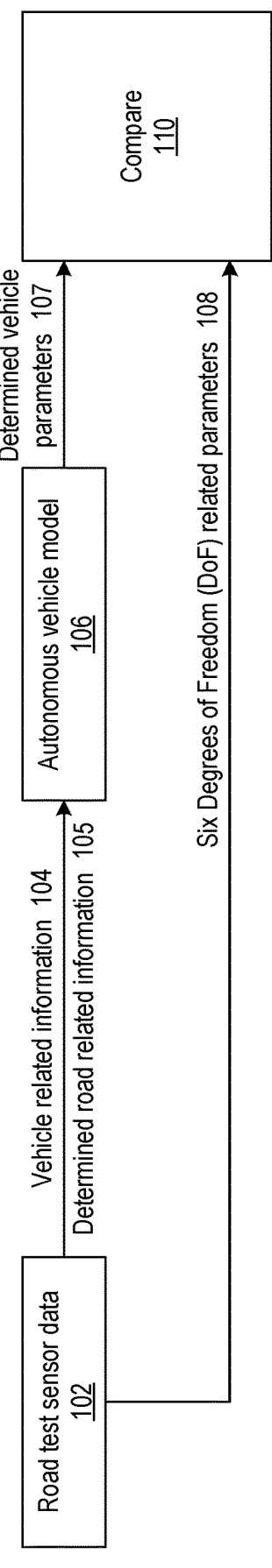
FIG. 1A shows an example block diagram to calibrate parameter(s) of an autonomous vehicle model.

Engineers developing autonomous vehicle technology can test an autonomous vehicle's driving related operations using a vehicle model. A vehicle model can allow engineers to test software to improve a vehicle's response. A vehicle model can be especially of importance when a vehicle is a semi-trailer truck that can experience unusual driving related conditions such as cross winds or jackknifing. Conventional technology can calibrate parameters of the vehicle model that describes driving related behaviors of a vehicle during specific road driving test performed by the vehicle. For example, longitudinal dynamic-related parameters are calibrated by driving a vehicle to obtain drag way test results including acceleration, deceleration, and cruising. Longitudinal dynamic-related parameters describe constant coefficients of vehicle dynamics along an imaginary longitudinal axis that extends from a front of the vehicle to a rear of the vehicle. Longitudinal dynamic-related parameters may include constant coefficients that can be related to longitudinal acceleration of the vehicle, longitudinal speed or square of the longitudinal speed of the vehicle, and drive force associated with the throttle of the vehicle. In another example, lateral dynamic-related parameters are calibrated by driving the vehicle at a test field running in a unit circle. Lateral dynamic-related parameters describe vehicle dynamics along an imaginary lateral axis that extends from a side of the vehicle to another side of the vehicle and that is perpendicular to the imaginary longitudinal axis. Lateral dynamic-related parameters may include constant coefficients that can be related to lateral acceleration of the vehicle and/or yaw rate of the vehicle. The imaginary longitudinal and lateral axes are parallel to the road. Thus, in conventional technology, a heavy workload of tests is required to calibrate the parameters of the vehicle model considering the variation of vehicle types and also the uncertainty of vehicle and road conditions.

To overcome at least the technical problems mentioned above, this patent document describes techniques to calibrate one or more longitudinal/lateral dynamic-related parameters of an autonomous vehicle model (or vehicle-dynamic model) by simulating and analyzing driving related behaviors (e.g., steering, throttle, etc.,) of the autonomous vehicle and road related information (e.g., slope and/or banking angle of the road) using information from a prior road test performed. The simulation of the driving related behaviors is performed by using the sensor data from a previously performed road tests with an autonomous vehicle model, where the autonomous vehicle model can provide an output related to the driving related behavior based on the sensor data and data determined from the sensor data. Thus, the techniques described in this patent document can overcome the drawbacks of existing technology where calibration of a vehicle model was heavily depended on specific field tests that are performed on a road. Furthermore, a calibrated autonomous vehicle model for simulation can allow engineers and technologist to test changes to the autonomous vehicle model without implementing the changes in an autonomous vehicle for an actual road driving test that may cause an accident or an improper driving related operation. Thus, a simulation with a calibrated autonomous vehicle model can provide a safe environment to obtain preliminary results of situations related to the autonomous vehicle before testing such situations in the road tests, or determine whether these situations should be tested in the road test.

FIG. 1A shows an example block diagram to calibrate parameter(s) of an autonomous vehicle model. A computer can store road test sensor data 102 from a previously performed road test, where the road test sensor data 102 can include information captured by sensors onboard the autonomous vehicle, and where the information captured by the sensors as a function of time can describe (1) an area or a road through or on which the autonomous vehicle operated, (2) objects around which the autonomous vehicle operated, and/or (3) vehicle related information 104 that describes information about the vehicle. The road test sensor data 102 can include time stamped information captured by the sensors. A simulation module of the computer (shown as 310 in FIG. 3) can perform the operations described in FIGS. 1A to 2B, 4 and 5 to calibrate one or more longitudinal/lateral dynamic-related parameters of the autonomous vehicle model.

The simulation module can obtain the vehicle related information 104 from the road test sensor data 102. The vehicle related information 104 may include vehicle information as a function of time such as the vehicle's steering or speed information over time (e.g., steering angle and/or speed at times t1, t2, t3, etc.,). The vehicle information included in the vehicle related information 104 can allow the simulation module to obtain the determined road related information 105 such as a banking angle, slope of the road, etc., as a function of time as further explained in FIGS. 1B and 1C.

Figure 1B:
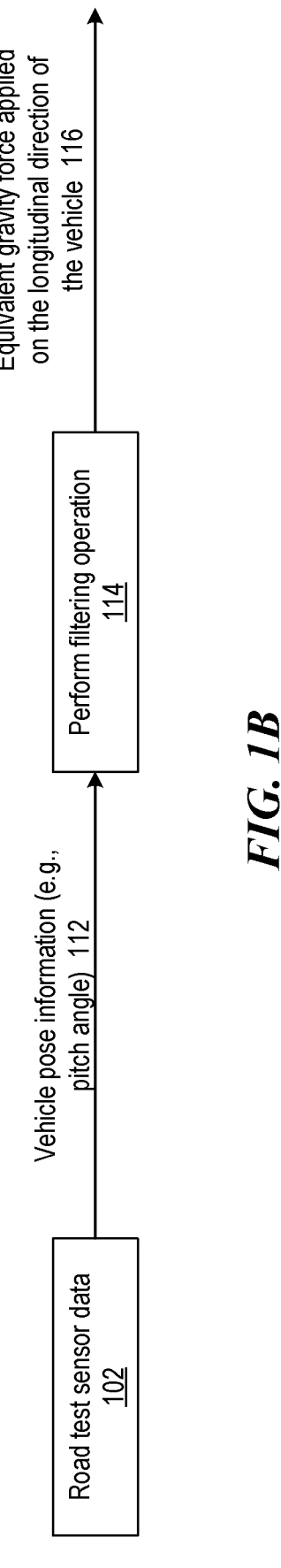
FIG. 1B shows a block diagram of operations performed by the simulation module to determine slope of a road based on a vehicle's pitch angle.

FIG. 1B shows a block diagram of operations performed by the simulation module to determine slope of a road based on a vehicle's pitch angle. The slope of the road can affect the longitudinal dynamic-related parameters. The road test sensor data 102 can provide a vehicle pose information 112, such as the pitch angle of the vehicle as a function of time. The pitch angle describes an upward angle or downward angle of the vehicle that forms by the vehicle driving up or down on a slope so that a direction in which the vehicle is driving up or down forms an upward angle or downward angle relative to an imaginary horizontal axis that extends from the front of the vehicle to the back of the vehicle. The vehicle pose information 112 can be included in the vehicle related information (104 in FIG. 1A). The simulation module may perform filtering operation 114 by filtering the pitch angle to reduce the suspension effect and to determine the slope of the road. The simulation module may perform the filtering operation 114 by using, for example, a second order low pass filter (LPF) to filter out variations in the vehicle's pitch angle which is associated with a high-frequency component. Thus, a technical benefit of performing the filtering operation on the pitch angle is to remove noise associated with a suspension effect where the vehicle bounces up and down which can affect the determination of the slope of the road. The output of the filtering operation 114 is an equivalent gravity force applied on the longitudinal direction of the vehicle 116. The simulation module can perform a trigonometric operation on the obtained equivalent gravity force applied on the longitudinal direction to determine a slope of the road. In an example embodiment, the simulation module can use the equation shown below to determine slope, where sin( ) is a trigonometric sine function:

$$\text{sin(slope)*gravity=equivalent gravity force applied on a longitudinal direction}$$

Figure 1C:
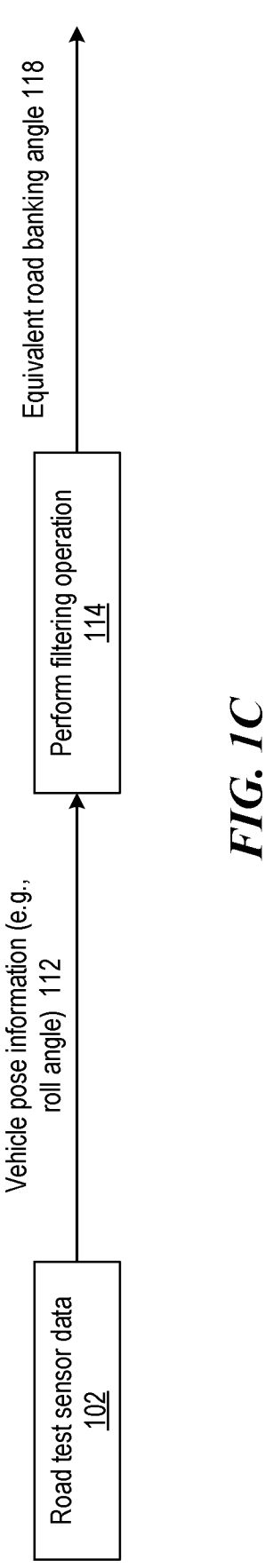
FIG. 1C shows a block diagram of operations performed by the simulation module to determine a banking angle of a road based on a vehicle's roll angle.

As shown in FIG. 1A, the determined road related information 105 includes the slope determined using the operations described in FIG. 1B. FIG. 1C shows a block diagram of operations performed by the simulation module to determine a banking angle of a road based on a vehicle's roll angle. The banking angle of the road can affect the lateral dynamic-related parameters. The road test sensor data 102 can provide a vehicle pose information 112, such as the roll angle of the vehicle as a function of time. The roll angle describes a sideways tilt angle of the vehicle that forms by the vehicle that tilts along a banked road so that a roll angle describes a tilt of the vehicle relative to an imaginary horizontal axis that extends from one side of the vehicle to the other side of the vehicle. The simulation module may perform filtering operation 114 by filtering the roll angle to reduce the suspension effect and to determine or obtain the banking angle of the road. The simulation module may perform the filtering operation 114 by using, for example, a second order low pass filter (LPF) to filter out variations in the vehicle's roll angle which is associated with a high-frequency component to obtain an equivalent road banking angle 118. Thus, a technical benefit of performing the filtering operation on the roll angle is to remove noise associated with a suspension effect where a rotational movement of the vehicle which can affect the determination of the banking angle of the road. The output of the filtering operation 114 is an equivalent road banking angle 118. The simulation module can perform a trigonometric operation on the equivalent road banking angle 118 to calculate the equivalent direction of gravity force that should be applied on the autonomous vehicle model. As shown in FIG. 1A, the determined road related information 105 includes the banking angle 118 determined using the operations described in FIG. 1C.

In FIG. 1A, the simulation module may send the vehicle related information 104 and the determined road related information 105 (e.g., slope and banking angle) to the autonomous vehicle model 106. The autonomous vehicle model 106 includes software code that can enable the simulation module to simulate a vehicle operating on the road based on the vehicle related information 104 and the determined road related information 105. In some implementations, the autonomous vehicle model 106 can be built or executed in MATLAB or Simulink. The autonomous vehicle model 106 can include any vehicle software model (including commercially available software model) that can determine and provide an output of a vehicle parameter based on one or more inputs provided to the vehicle model.

After the simulation module executes the software code related to the autonomous vehicle model 106, the simulation module can determine vehicle parameters 107 based on the vehicle related information 104 and the determined road related information 105. The determined vehicle parameters 107 may include longitudinal acceleration of the vehicle, longitudinal speed/the square of longitudinal speed of the vehicle, drive force associated with the throttle of the vehicle, lateral acceleration of the vehicle, and/or yaw rate of the vehicle. Longitudinal speed of the vehicle can indicate forward direction speed of the vehicle. The yaw rate describes a rate at which a vehicle rotates or a rate of change of the direction in which the vehicle turns.

In FIG. 1A, the simulation module can also obtain six degrees of freedom (DoF) related parameters 108 from the road test sensor data 102. The six DoF related parameters 108 are associated with a same time stamp as that associated with the vehicle related information 104 obtained from the road test sensor data 102. The six DoF related parameters 108 may include longitudinal speed of the vehicle, lateral speed of the vehicle, longitudinal speed of the vehicle, pitch angle of the vehicle, yaw rate of the vehicle, and roll angle of the vehicle. At operation 110, the simulation module can compare the determined vehicle parameters 107 obtained from the autonomous vehicle model 106 with the six DoF related parameters 108 to determine whether and how much to calibrate the longitudinal/lateral dynamic-related parameters. Further description related to the comparison of the determined vehicle parameters 107 with the six DoF related parameters 108 are described in FIGS. 2A-2B.

Figure 2A:
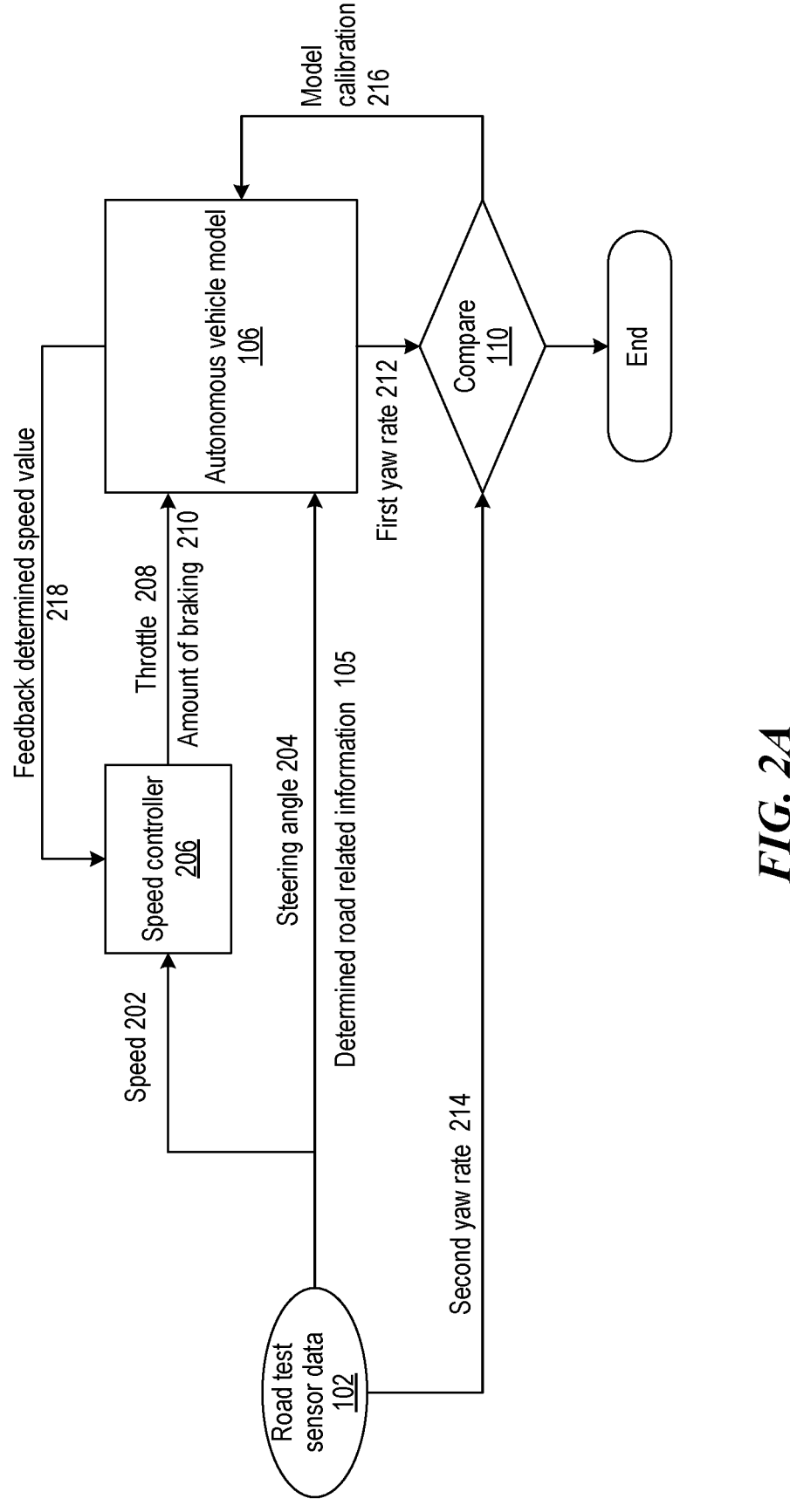
FIGS. 2A-2B show frameworks for analyzing vehicle parameters determined by an autonomous vehicle model with one or more parameters from six DoF parameters obtained from a road test sensor data.

FIG. 2A show a framework for analyzing a vehicle modeling parameter on lateral dynamics determined by an autonomous vehicle model with a parameter from six DoF parameters obtained from a road test sensor data. In FIG. 2A, the simulation module may obtain the road test sensor data 102 that is previously stored in memory as mentioned in the description associated with FIG. 1A. The road test sensor data 102 provides speed 202 of the vehicle and steering angle 204 of the vehicle. The simulation module can provide the determined road related information 105 (e.g., banking angle) to the autonomous vehicle model 106. The simulation module processes the speed 202 of the vehicle using a speed controller 206 (e.g., proportional-integral-derivative (PID) control method) to obtain a value that indicates an amount of throttle 208 of the vehicle and optionally another value (e.g., percentage) that indicates an amount of braking 210 applied by the vehicle. The simulation module may send the steering angle 204 and the amount of throttle 208 to the autonomous vehicle model 106. In some embodiments, the simulation module can optionally send the braking value 210 to the autonomous vehicle model 106.

As explained in FIG. 1A, the simulation module can perform simulation related operations using the steering angle 204, the amount of throttle 208, and the determined banking angle using the software code associated with the autonomous vehicle model 106 to output a first yaw rate 212 and a speed value 218 that are determined for the vehicle. The simulation module may perform a compare operation 110 by comparing the first yaw rate 212 determined from the autonomous vehicle model 106 and a second yaw rate 214 obtained from the road test sensor data 102. The first yaw rate 212 is associated with a same time stamp as that associated with the second yaw rate 214 so that the two yaw rates can be compared. The speed controller 206 can use the simulated speed value 218 with the reference speed 202 of the vehicle obtained from the road test sensor data 102 for to calculate the throttle 208.

At the compare operation 110, if the simulation module determines that the difference between the first yaw rate 212 and the second yaw rate 214 is less than or equal to a pre-determined threshold, then the simulation module determines that the autonomous vehicle model 106 is calibrated and the simulation module determines not to change one or more lateral dynamic-related parameters of the autonomous vehicle model 106, and the process ends. At the compare operation 110, if the simulation module determines that the difference between the first yaw rate 212 and the second yaw rate 214 is greater than the pre-determined threshold, then the simulation module can determine a difference between the first yaw rate 212 and the second yaw rate 214 to obtain a yaw rate error. The simulation module can send the yaw rate error to the autonomous vehicle model 106 at the model calibration 216 step. The autonomous vehicle model 106 can store the yaw rate error so that the yaw rate error can be added to or subtracted from the first yaw rate 212 and/or any subsequent yaw rate determinations.

The simulation module can use a proportional integral (PI) controller to further process the yaw rate error to further calibrate the autonomous vehicle model 106 after the simulation described in FIG. 1A is completed. The algorithm performed by simulation module using the PI controller can be any algorithm for a PI controller such as a high gain closed loop PI controller with which an updated value for a lateral dynamic-related parameter can be determined by the simulation module. As an example, the high gain PI controller can determine a front tire lateral stiffness gain parameter by using the determined yaw rate error. The front tire lateral stiffness gain parameter an example of lateral dynamic-related parameters. The front tire lateral stiffness describes an amount of force generated by the tires. Thus, a force exerted by the vehicle can be described as the front tire lateral stiffness divided by a slip angle, where the slip angle is an angle between a direction in which a wheel is pointing and the direction in which the wheel is actually moving. After the high-gain PI controller determines the front tire lateral stiffness gain parameter, the simulation module can multiply the front tire lateral stiffness parameter by the front tire lateral stiffness gain parameter to obtain a new lateral stiffness parameter. The simulation module can send the new lateral stiffness parameter to the autonomous vehicle model 106 so that the autonomous vehicle model 106 can use it for the next time a simulation is performed. Thus, the determination of the new lateral stiffness parameter using the yaw rate error is not performed in real-time as the simulation is performed but after the simulation is performed.

Figure 2B:
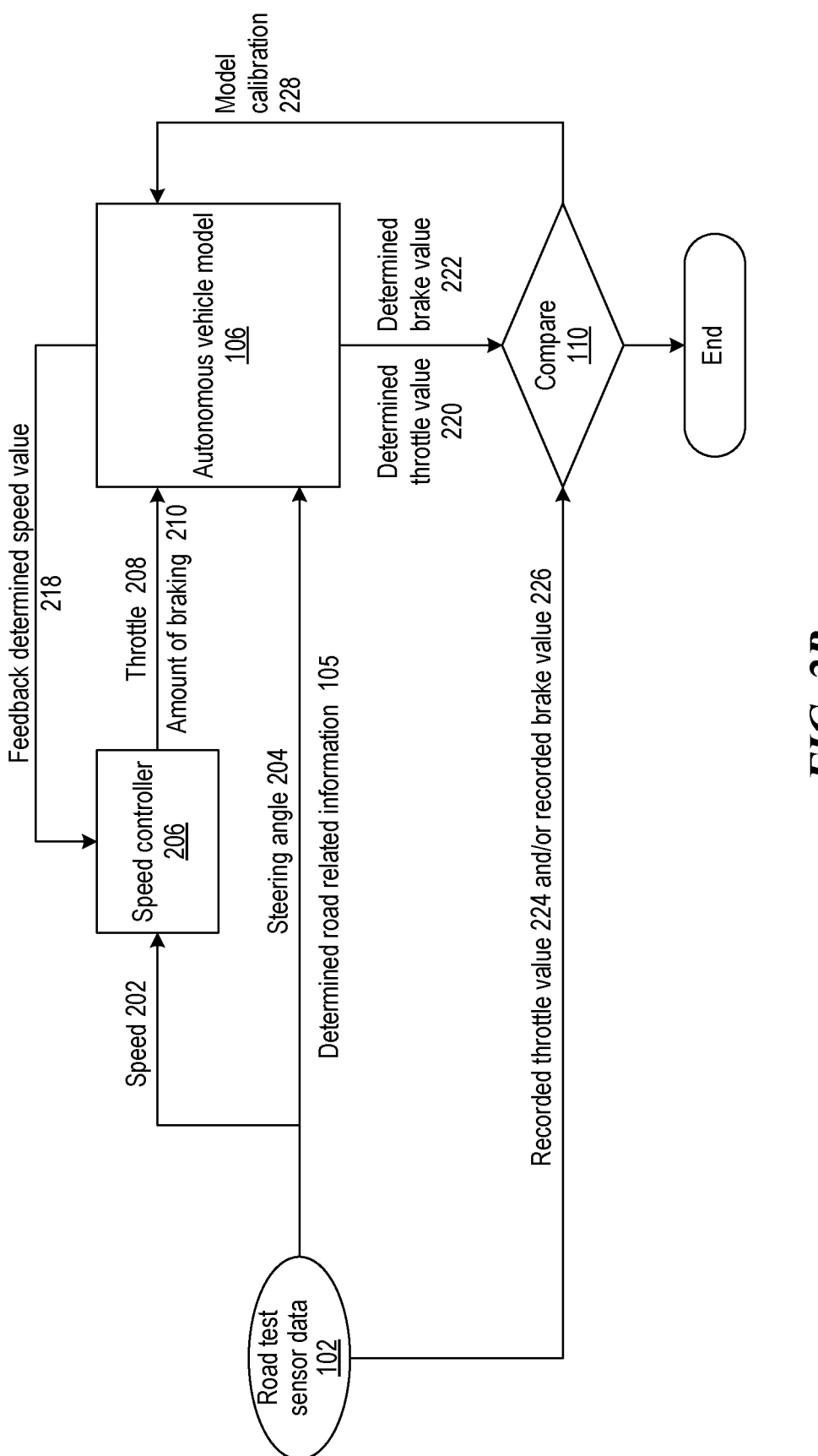

FIG. 2B show a framework for analyzing a vehicle modeling parameter(s) on longitudinal dynamics determined by an autonomous vehicle model with a parameter from six DoF parameters obtained from a road test sensor data. In FIG. 2B, the simulation module may obtain the road test sensor data 102 that is previously stored in memory as mentioned in the description associated with FIG. 1A. The road test sensor data 102 provides speed 202 of the vehicle and steering angle 204 of the vehicle. The simulation module can provide the determined road related information 105 (e.g., slope) to the autonomous vehicle model 106. The simulation module processes the speed 202 of the vehicle using a speed controller 206 to obtain a value that indicates an amount of throttle 208 of the vehicle and optionally another value (e.g., percentage) that indicates an amount of braking 210 applied by the vehicle. The simulation module may send the steering angle 204 and the amount of throttle 208 to the autonomous vehicle model 106. In some embodiments, the simulation module can optionally send the braking value 210 to the autonomous vehicle model 106.

The simulation module can perform simulation related operations using the amount of throttle 208, the steering angle 204, and the determined slope of the road using the software code associated with the autonomous vehicle model 106 to output a determined throttle value 220 which is the output of the speed controller 206 for tracking the road test speed in simulation, and a longitudinal speed value 218 which is from the autonomous vehicle model 106, and optionally a determined brake value 222 that indicates an amount of brakes applied. The simulation module may perform a compare operation 110 by comparing the determined throttle value 220 with the recorded throttle value 224. In some embodiments, the simulation module can optionally compare the determined brake value 222 with the recorded brake value 226 obtained by the simulation module from the road test sensor data 102. The determined throttle value 220 and a determined brake value 222 are associated with a same time stamp as that associated with the recorded throttle value 224 and the recorded brake value 226, respectively, so that the two sets of values can be compared. The speed controller 206 can use the feedback speed value 218 with the speed 202 of the vehicle obtained from the road test sensor data 102 to calculate the next throttle value for the next time stamp.

At the compare operation 110, if the simulation module determines that the difference between the determined throttle value 220 and the recorded throttle value 224 is less than or equal to a first pre-determined threshold, then the simulation module determines that the autonomous vehicle model 106 is calibrated and the simulation module determines not to change one or more longitudinal dynamic-related parameter of the autonomous vehicle model 106 and the process ends. In some embodiments, at the compare operation 110, if the simulation module determines that the difference between the determined brake value 222 and the recorded brake value 226 is less than or equal to a second pre-determined threshold, then the simulation module determines that the autonomous vehicle model 106 is calibrated and the simulation module determines not to change one or more longitudinal dynamic-related parameter of the autonomous vehicle model 106 and the process ends.

At the compare operation 110, if the simulation module determines that the difference between the determined throttle value 220 and the recorded throttle value 224 is greater than the first pre-determined threshold, then the simulation module can use an upper diagonal-recursive least squares (UD-RLS) estimation technique to determine one or more longitudinal dynamic-related parameters of the autonomous vehicle model 106 that should be changed or calibrated in the autonomous vehicle model 106 as further described in FIG. 5.

FIG. 5 shows an example block diagram for a simulation module to use UD-RLS estimation technique to determine one or more longitudinal dynamic-related parameters of an autonomous vehicle. As shown in block 502, the measured parameters at time t are obtained from road test sensor data 102 which is input in the UD-RLS estimation technique to obtain values for variables m, A, B, C for a first vector associated with the road test data. The measured parameters for block 502 include $a_{Long}$, which is a measured longitudinal acceleration of the vehicle at time t, $V_{spd}$ which is a longitudinal speed (202 in FIG. 2A or 2B), and $F_{drive}$ which is drive force value of the vehicle (224 FIG. 2B). As shown in block 504, the simulated parameters at time t are obtained from operations performed in FIGS. 1A, 2A, and 2B, where $a_{Long}$ is the longitudinal acceleration of the vehicle obtained from the simulation, $V_{spd}$ is the longitudinal speed obtained from the simulation, and $F_{drive}$ is drive force value of the vehicle obtained from the simulation. The values or the change of the values of $a_{Long}$, $V_{spd}$, and $F_{drive}$ mentioned above presents the vehicle dynamics which are calibrated by the determined vehicle parameters 107 described in FIG. 1A. At block 504, the simulation module inputs the simulation parameters into the UD-RLS estimation technique to obtain values for variables m, a, b, c for a second vector associated with the simulation data. The simulation module calibrates the longitudinal dynamic-related parameters (e.g., m, a, b, c) by determining a set of error or offset values by taking the difference between the first and second vectors as shown in block 506. At the model calibration step 228 in FIG. 2B, the determined set of error or offset values are sent to the autonomous vehicle model 106 for improving the modeling accuracy.

The simulation module can send the lateral and/or longitudinal dynamic-related parameters to a controller, or estimator, or planner (e.g., microcontroller or a computer) located in an autonomous vehicle.

Regarding the application of controller, the autonomous vehicle can perform model-based autonomous driving related control or operations by using the lateral and/or longitudinal dynamic-related parameters obtained from the simulation module. For example, the controller can determine and send a throttle command to achieve a desired longitudinal acceleration of the vehicle by obtaining or determining a current vehicle drag resistance with longitudinal dynamic-related parameters obtained from the simulation module, where the throttle command can be determined based at least on the current vehicle drag resistance.

Regarding the application of estimator, the vehicle dynamics parameters from this simulation module can improve the estimator performance quality using fusion methods. For example, the threshold of estimator can be designed to refer to the dynamic-related parameters obtained from simulation module. If a module of a computer located in the vehicle determines that the output of the estimator is greater than the threshold, the estimator can be saturated within a region.

Regarding the application of planner, the feasibility of the planned vehicle future trajectory can be improved by taking the estimated vehicle dynamics parameters from simulation module as a reference of future feasible vehicle trajectory generation. For example, with known dynamic-related parameters obtained from simulation module, a module in a computer in an autonomous vehicle can calculate a maximum acceleration for the autonomous vehicle not only for a current time point but also for one or more time points in the future. When the planner is calculating the planning trajectory for the autonomous vehicle, the module can determine the maximum allowed acceleration of each point along the trajectory of the autonomous vehicle and send to the planner, which can improve the feasibility or quality of the trajectory solved from the planner.

Figure 3:
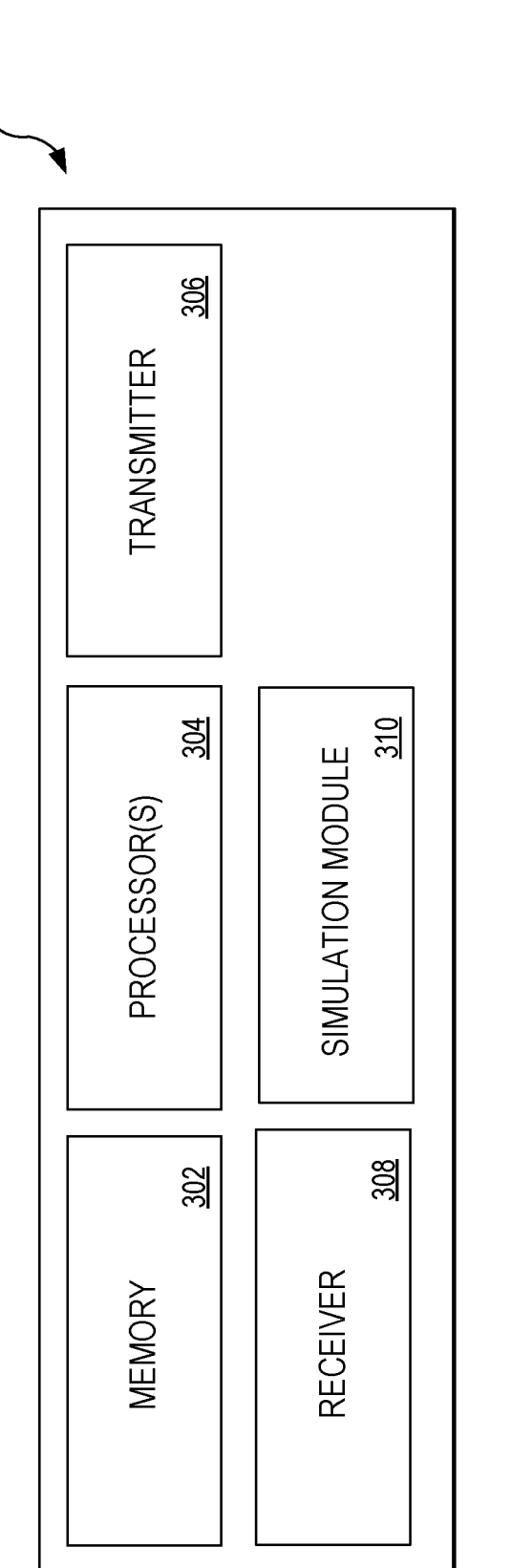
FIG. 3 shows an exemplary block diagram of a computer that performs a simulation to calibrate parameters for an autonomous driving model.

FIG. 3 shows an exemplary block diagram of a computer that performs a simulation to calibrate parameters for an autonomous driving model. The computer 300 includes at least one processor 304 and a memory 302 having instructions stored thereupon. The instructions upon execution by the processor 304 configure the computer 300 to perform the operations described in FIGS. 1A to 2B and 4, the operations related to the simulation module 310, and/or the operations in the various embodiments described in this patent document. The transmitter 306 and receiver 308 may send and receive information, respectively.

FIG. 4 shows an example flowchart of calibrating one or more parameters for a vehicle. Operation 402 includes obtaining, from sensor data related to a road test previously performed by the vehicle, a plurality of vehicle related parameters associated with a same time stamp, where the plurality of vehicle related parameters include a pitch angle of the vehicle and a roll angle of the vehicle. Operation 404 includes performing a first determination of a slope of a road and a banking angle of the road based on the pitch angle of the vehicle and the roll angle of the vehicle, respectively. Operation 406 includes performing a second determination, without performing an additional road test by the vehicle, of a set of parameters that describe a driving-related operation of the vehicle, where the set of parameters include a first yaw rate of the vehicle that is determined based at least on the banking angle, and where the set of parameters include a first amount of throttle of the vehicle that is determined based at least on the slope. Operation 408 includes performing a third determination that at least one difference between at least one value from the set of parameters and a corresponding parameter from the plurality of vehicle related parameters exceeds at least one threshold value. Operation 410 includes obtaining, in response to the third determination, a calibrated longitudinal dynamic-related parameter or a calibrated lateral dynamic-related parameter by calibrating a longitudinal dynamic-related parameter or a lateral dynamic-related parameter, where the calibrated longitudinal dynamic-related parameter or the calibrated lateral dynamic-related parameter is sent to the vehicle or another vehicle, and where the calibrated longitudinal dynamic-related parameter or the calibrated lateral dynamic-related parameter is used by subsequent autonomous driving operations of the vehicle or the another vehicle.

In some embodiments, the longitudinal dynamic-related parameter includes one or more constant coefficients that is related to a longitudinal acceleration of the vehicle, or a drive force applied by the vehicle. In some embodiments, the lateral dynamic-related parameter includes one or more constant coefficients that is related to a lateral acceleration of the vehicle. In some embodiments, the set of parameters are determined by simulating the driving-related operation of the vehicle. In some embodiments, the slope of the road is determined by: filtering the pitch angle of the vehicle using a second order low pass filter to obtain a filtered pitch angle; determining an equivalent gravity force applied in a longitudinal direction of the vehicle using the filtered pitch angle; and determining the slope of the road by using the following equation: sin (the slope)*gravity=the equivalent gravity force applied on the longitudinal direction, where sin( ) is a trigonometric sine function. In some embodiments, the banking angle of the road is determined by: filtering the roll angle of the vehicle using a second order low pass filter to obtain the banking angle.

In some embodiments, the plurality of vehicle related parameters include a speed of the vehicle and a steering angle of the vehicle, and the set of parameters are determined by: determining an amount of throttle of the vehicle based on the speed of the vehicle; and determining the first yaw rate of the vehicle based on the amount of throttle, the steering angle of the vehicle, and the banking angle. In some embodiments, the at least one value from the set of parameters is the first yaw rate, and the third determination is performed by determining that a difference between the first yaw rate and a second yaw rate obtained from the plurality of vehicle related parameters is greater than a first predetermined threshold value. In some embodiments, the plurality of vehicle related parameters include a speed of the vehicle and a steering angle of the vehicle, a second amount of throttle of the vehicle is determined based on the speed of the vehicle, and the set of parameters includes the first amount of throttle of the vehicle that is determined based on the second amount of throttle, the steering angle of the vehicle, and the slope.

In some embodiments, the third determination is performed by determining that a difference between the first amount of throttle and a third amount of throttle obtained from the plurality of vehicle related parameters is greater than a second pre-determined threshold value. In some embodiments, the sensor data is obtained from sensors located on the vehicle and characterizes the road on which the vehicle is previously operated or an environment in which the vehicle is previously operated. In some embodiments, the longitudinal dynamic-related parameter includes one or more constant coefficients that is related to a longitudinal speed of the vehicle. In some embodiments, the lateral dynamic-related parameter includes one or more constant coefficients that is related to a yaw rate of the vehicle.

In some embodiments, the slope is determined by filtering the pitch angle of the vehicle to obtain a filtered pitch angle; determining an equivalent gravity force applied in a longitudinal direction of the vehicle using the filtered pitch angle; and determining the slope of the road based on gravity and the equivalent gravity force applied on the longitudinal direction. In some embodiments, the banking angle of the road is determined by: filtering the roll angle of the vehicle to obtain the banking angle. In some embodiments, the set of parameters are determined by determining a first yaw rate of the vehicle based on an amount of throttle, a steering angle of the vehicle, and the banking angle. In some embodiments, the set of parameters includes a first amount of throttle of the vehicle that is determined based on a second amount of throttle, a steering angle of the vehicle, and the slope, and the second amount of throttle of the vehicle is based on a speed of the vehicle. In some embodiments, the at least one value from the set of parameters is a drive force value.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of calibrating a parameter related to a vehicle, comprising:
obtaining, from sensor data related to a road test previously performed by the vehicle, a plurality of vehicle related parameters associated with a same time stamp, wherein the plurality of vehicle related parameters include a pitch angle of the vehicle and a roll angle of the vehicle;
performing a first determination of a slope of a road and a banking angle of the road based on the pitch angle of the vehicle and the roll angle of the vehicle, respectively;
performing a second determination, without performing an additional road test by the vehicle, of a set of parameters that describe a driving-related operation of the vehicle,
wherein the set of parameters include a first yaw rate of the vehicle that is determined based at least on the banking angle, and
wherein the set of parameters include a first amount of throttle of the vehicle that is determined based at least on the slope;
performing a third determination that at least one difference between at least one value from the set of parameters and a corresponding parameter from the plurality of vehicle related parameters exceeds at least one threshold value;
obtaining, in response to the third determination, a calibrated longitudinal dynamic-related parameter or a calibrated lateral dynamic-related parameter by calibrating a longitudinal dynamic-related parameter or a lateral dynamic-related parameter; and
sending the calibrated longitudinal dynamic-related parameter or the calibrated lateral dynamic-related parameter to the vehicle to cause the vehicle to use the calibrated longitudinal dynamic-related parameter or the calibrated lateral dynamic-related parameter to perform autonomous driving operations.

2. The method of claim 1, wherein the longitudinal dynamic-related parameter includes one or more constant coefficients that is related to a longitudinal acceleration of the vehicle, or a drive force applied by the vehicle.

3. The method of claim 1, wherein the lateral dynamic-related parameter includes one or more constant coefficients that is related to a lateral acceleration of the vehicle.

4. The method of claim 1, wherein the set of parameters are determined by simulating the driving-related operation of the vehicle.

5. The method of claim 1, wherein the slope of the road is determined by:

filtering the pitch angle of the vehicle using a second order low pass filter to obtain a filtered pitch angle;
determining an equivalent gravity force applied in a longitudinal direction of the vehicle using the filtered pitch angle; and
determining the slope of the road by using following equation:
sin (the slope)*gravity=the equivalent gravity force applied on the longitudinal direction,
wherein sin( ) is a trigonometric sine function.

6. The method of claim 1, wherein the banking angle of the road is determined by:
filtering the roll angle of the vehicle using a second order low pass filter to obtain the banking angle.

7. The method of claim 1,
wherein the plurality of vehicle related parameters include a speed of the vehicle and a steering angle of the vehicle, and
wherein the set of parameters are determined by:
determining an amount of throttle of the vehicle based on the speed of the vehicle; and
determining the first yaw rate of the vehicle based on the amount of throttle, the steering angle of the vehicle, and the banking angle.

8. The method of claim 7,
wherein the at least one value from the set of parameters is the first yaw rate, and
wherein the third determination is performed by determining that a difference between the first yaw rate and a second yaw rate obtained from the plurality of vehicle related parameters is greater than a first pre-determined threshold value.

9. The method of claim 1,
wherein the plurality of vehicle related parameters include a speed of the vehicle and a steering angle of the vehicle,
wherein a second amount of throttle of the vehicle is determined based on the speed of the vehicle, and
wherein the set of parameters includes the first amount of throttle of the vehicle that is determined based on the second amount of throttle, the steering angle of the vehicle, and the slope.

10. The method of claim 9,
wherein the third determination is performed by determining that a difference between the first amount of throttle and a third amount of throttle obtained from the plurality of vehicle related parameters is greater than a second pre-determined threshold value.

11. The method of claim 1, wherein the sensor data is obtained from sensors located on the vehicle and characterizes the road on which the vehicle is previously operated or an environment in which the vehicle is previously operated.

12. An apparatus for autonomous vehicle operation, comprising:
at least one processor configured to implement a method, the at least one processor configured to: obtain, from sensor data related to a road test previously performed by a vehicle, a plurality of vehicle related parameters associated with a same time stamp,
wherein the plurality of vehicle related parameters include a pitch angle of the vehicle and a roll angle of the vehicle;
perform a first determination of a slope of a road and a banking angle of the road based on the pitch angle of the vehicle and the roll angle of the vehicle, respectively;

perform a second determination, without performing an additional road test by the vehicle, of a set of parameters that describe a driving-related operation of the vehicle, wherein the set of parameters include a first yaw rate of the vehicle that is determined based at least on the banking angle, and wherein the set of parameters include a first amount of throttle of the vehicle that is determined based at least on the slope;

perform a third determination that at least one difference between at least one value from the set of parameters and a corresponding parameter from the plurality of vehicle related parameters exceeds at least one threshold value;

obtain, in response to the third determination, a calibrated longitudinal dynamic-related parameter or a calibrated lateral dynamic-related parameter by calibrating a longitudinal dynamic-related parameter or a lateral dynamic-related parameter; and send the calibrated longitudinal dynamic-related parameter or the calibrated lateral dynamic-related parameter to the vehicle to cause the vehicle to use the calibrated longitudinal dynamic-related parameter or the calibrated lateral dynamic-related parameter to perform autonomous driving operations.

13. The apparatus of claim 12, wherein the longitudinal dynamic-related parameter includes one or more constant coefficients that is related to a longitudinal speed of the vehicle.

14. The apparatus of claim 12, wherein the lateral dynamic-related parameter includes one or more constant coefficients that is related to a yaw rate of the vehicle.

15. The apparatus of claim 12, wherein the slope is determined by the at least one processor configured to:

filter the pitch angle of the vehicle to obtain a filtered pitch angle;

determine an equivalent gravity force applied in a longitudinal direction of the vehicle using the filtered pitch angle, and determine the slope of the road based on gravity and the equivalent gravity force applied on the longitudinal direction.

16. The apparatus of claim 12, wherein the banking angle of the road is determined by the at least one processor configured to:

filter the roll angle of the vehicle to obtain the banking angle.

17. A non-transitory computer readable program storage medium having code stored thereon, the code, when executed by a processor, causing the processor to implement a method, comprising:

obtaining, from sensor data related to a road test previously performed by a vehicle, a plurality of vehicle related parameters associated with a same time stamp, wherein the plurality of vehicle related parameters include a pitch angle of the vehicle and a roll angle of the vehicle;

performing a first determination of a slope of a road and a banking angle of the road based on the pitch angle of the vehicle and the roll angle of the vehicle, respectively;

performing a second determination, without performing an additional road test by the vehicle, of a set of parameters that describe a driving-related operation of the vehicle, wherein the set of parameters include a first yaw rate of the vehicle that is determined based at least on the banking angle, and wherein the set of parameters include a first amount of throttle of the vehicle that is determined based at least on the slope;

performing a third determination that at least one difference between at least one value from the set of parameters and a corresponding parameter from the plurality of vehicle related parameters exceeds at least one threshold value;

obtaining, in response to the third determination, a calibrated longitudinal dynamic-related parameter or a calibrated lateral dynamic-related parameter by calibrating a longitudinal dynamic-related parameter or a lateral dynamic-related parameter; and sending the calibrated longitudinal dynamic-related parameter or the calibrated lateral dynamic-related parameter to the vehicle to cause the vehicle to use the calibrated longitudinal dynamic-related parameter or the calibrated lateral dynamic-related parameter to perform autonomous driving operations.

18. The non-transitory computer readable program storage medium of claim 17, wherein the set of parameters are determined by determining the first yaw rate of the vehicle that is based on an amount of throttle, a steering angle of the vehicle, and the banking angle.

19. The non-transitory computer readable program storage medium of claim 17, wherein the set of parameters includes the first amount of throttle of the vehicle that is determined based on a second amount of throttle, a steering angle of the vehicle, and the slope, and wherein the second amount of throttle of the vehicle is based on a speed of the vehicle.

20. The non-transitory computer readable program storage medium of claim 19, wherein the at least one value from the set of parameters is a drive force value.

* * * * *